Patented Oct. 29, 1935

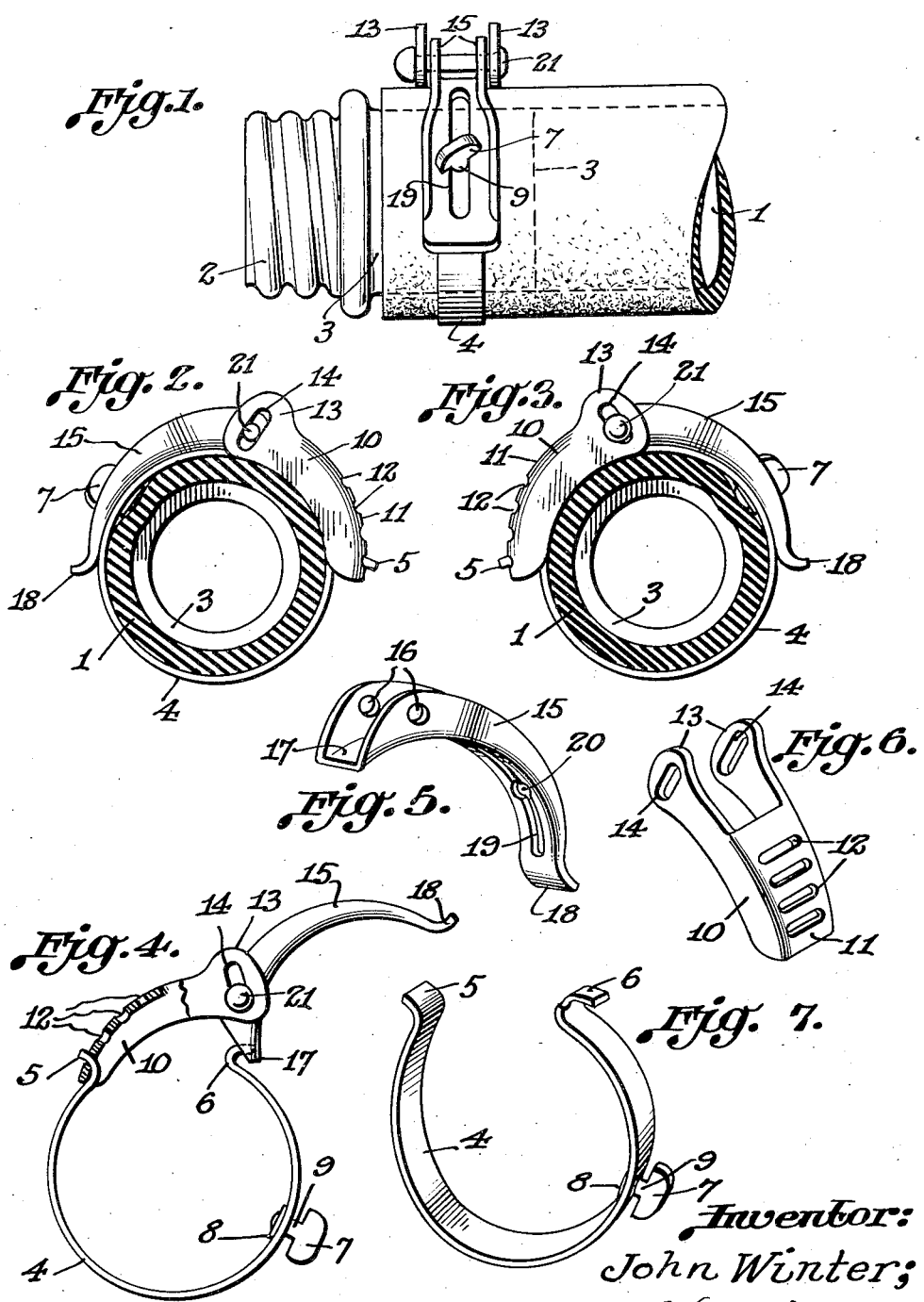

2,018,906

UNITED STATES PATENT OFFICE 2,018,906

HOSE CLAMP

John Winter, Goshen, Ind., assignor to Winter Stamping Company, Goshen, Ind., a corporation of Indiana Application March 4, 1935, Serial No. 9,324

4 Claims. (Cl. 24—19)

My invention relates to a hose clamp of the type having a flexible metal band and a tightening device between the ends of the band, said tightening device consisting of a link adapted to be attached to one end of the band in any of different adjusted positions, and to the other end of which band a lever is journaled, by the turning of which lever toward the band the ends of the band will be moved towards one another and thus the band tightened around a hose to fasten it tightly to a nozzle or the like. It is the especial object of my invention to provide certain improvements in the construction of such a hose clamp whereby to reduce the cost of production as compared with a hose clamp of the type shown in Patent 1,564,837, granted December 8, 1925, Edeborg, which patent is now owned by the Winter Stamping Company. I attain the objects of my invention by the means illustrated in the accompanying drawing, in which—

Figure 1 is a front plan of my invention applied to a hose;

Fig. 2 is a side elevation of same, the hose being shown in section;

Fig. 3 is a similar view of the reverse side of the clamp;

Fig. 4 is a side elevation of the hose clamp removed from the hose and with its members in unclamped position;

Fig. 5 is a detail perspective view of clamp member 17;

Fig. 6 is a detail perspective view of improved link member 11; and

Fig. 7 is a detail perspective view of band 4 and locking knob 7.

Like numerals designate like parts in each of the several views.

Referring to the accompanying drawing, there is illustrated a portion of a hose 1, a threaded nozzle 2, a shank 3 of said nozzle, which is engaged by the end of a hose 1. I provide the usual band 4 having outturned ends 5 and 6. Mounted on band 4 for pivotal movement is a locking knob 7 having its shaft 9 affixed to a washer or plate 8 on the inner wall of the band 4, as shown in Fig. 4. Link 11, as shown in Fig. 6, has downturned sides 10 which terminate in end portions 13 in which are the elongated slots 14 shown in Figs. 3, 4, and 6. A clamp lever 17 is pivoted by means of pivot pin 21 in the slots 14, the pin 21 being mounted in the upturned sides 15, which sides also function as a guard for the knob 7 to prevent accidental operation of same. Lever 17 has an outturned end 18 to be grasped by the finger in operating the lever. It also has a longitudinal slot 19, said slot having a slightly enlarged portion 20, as shown in Fig. 5. As shown in Fig. 5, the pin 21 passes through the apertures 16 in the sides 15 to pivotally attach the lever 17 to the link 11.

The device is engaged around a hose in the manner shown in Figs. 1, 2, and 3. The unclamped position of the device is shown in Fig. 4, with lever 17 raised, and with the outturned end 6 of band 4 engaging the inner end of the lever. As the lever is pressed down to the position shown in Fig. 3 the band is tightened around the hose. The outturned end 5 of the band may be engaged in any of the slots 12 in the link 11, thereby permitting of a considerable range of adjustment in the diameter of the device. As the link 11 is formed of one single piece of metal which may be stamped out, the expense of production is much reduced as compared with the prior art where a number of separate parts are required to be manufactured and put together to produce the link.

It may be noted that the friction washer or plate 8 is rigidly attached to the lower end of the shaft 9 of the locking knob 7, this plate making contact with the inside surface of the band. When the clamp is installed upon hose and the knob turned to locking position, the friction of the washer or plate 8 against the surface of the hose prevents the knob from turning and unlocking the clamp. This locking knob is further prevented from turning from outside contact with some foreign body by the upturned sides 15 of the lever which are so formed as to partially enclose the upper portion of the knob 7.

What I claim is:

1. In a hose clamp, the combination of a flexible metal band having outturned ends, a link having a series of spaced slots any of which is engageable by an outturned end of said band, a clamp lever pivotally mounted on the other end of said link and having an end portion thereof engageable by the other outturned end of the flexible band for tightening the band about a hose, said clamp lever having a longitudinal slot therein, a locking knob, a washer disposed on the inner wall of the flexible metal band and to which the locking knob is rigidly affixed, said washer frictionally engaging the surface of the hose to retain the locking knob in adjusted locking position on the clamp lever.

2. In a hose clamp, the combination of a flexible metal band, a link T-shaped in cross section and having a series of parallel slots to any of which one end of the said band is detachably and adjustably engageable, a clamp lever pivotally attached to said link and having one of its ends engaging the other end of the flexible metal band, said clamp lever having upturned sides, and a locking knob carried by the metal band and engageable with the clamp lever and disposed between the upturned sides of the clamp lever when in locking position.

3. In a hose clamp, the combination of a flexible metal band having outturned ends, a link T-shaped in cross section and having a plurality of spaced slots in any one of which an outturned end of said band is adjustably engageable, said link having extended sides, a clamp lever having upturned sides, a pivot pin engaging the extended sides of the link and the upturned sides of the clamp lever for pivotally mounting the clamp lever on the link, said clamp lever engaging the other outturned end of the metal band, and locking means releasably engaging the clamp lever and for which the upturned sides of the clamp lever function as guard members.

4. In a hose clamp, the combination of a flexible metal band having outturned ends, a link having a series of spaced parallel slots stamped therein and having downturned sides extended beyond the body of the link, said sides having slots, a clamp lever pivotally mounted in the slotted sides of said link and having one end engaging the outturned end of the metal band, means for locking the clamp lever in locked position against the metal band to tighten same around a hose, said locking means including a washer on the inner side of the metal band frictionally engaging the hose to hold the locking means in any adjusted locking position, substantially as described.

JOHN WINTER.